Dec. 26, 1967  A. F. SAXON  3,359,649
APPARATUS FOR THE HEATING OF BULK MATERIAL AND
RECOVERY OF VAPORIZABLE PRODUCT THEREFROM
Filed Feb. 24, 1966
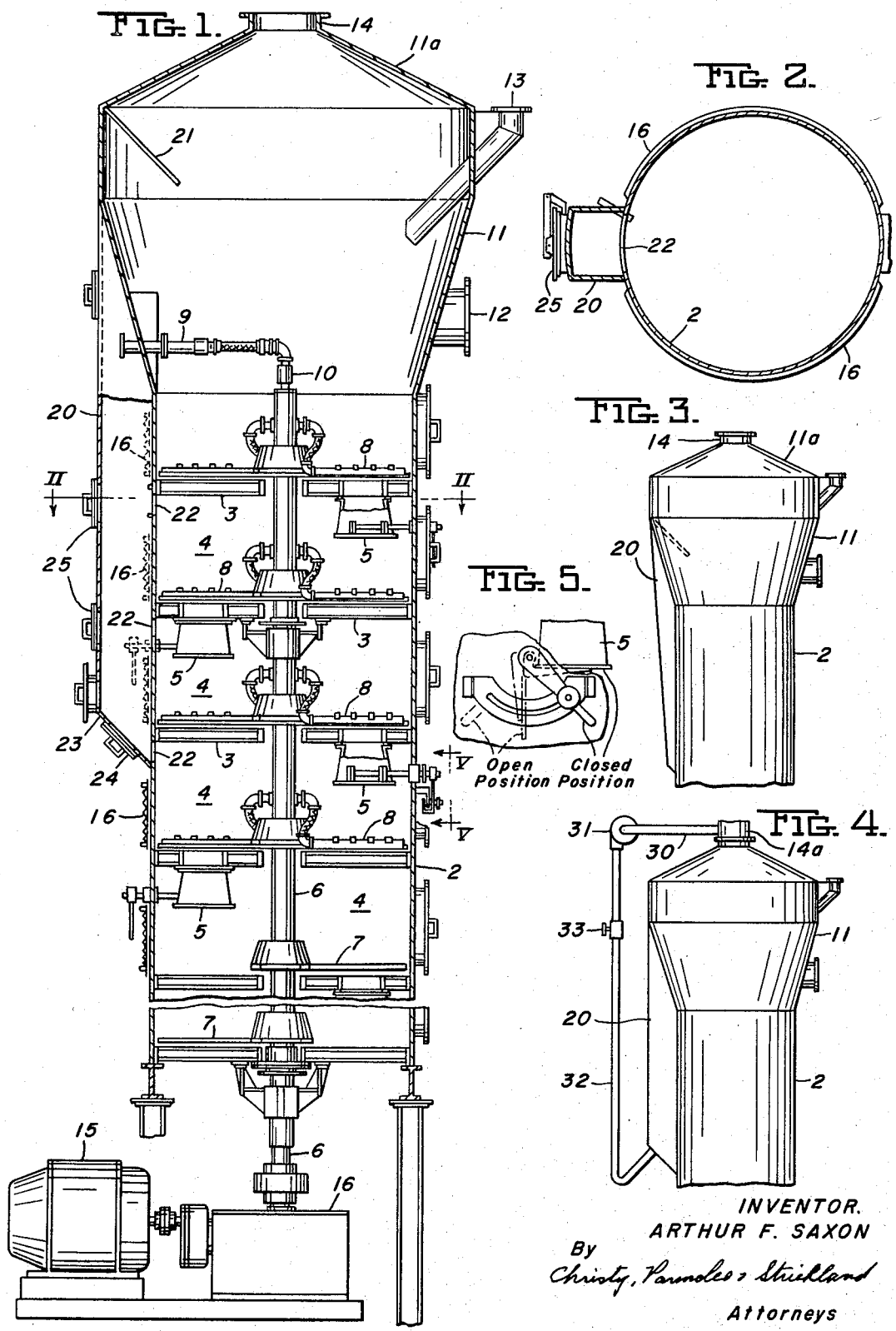
INVENTOR.
ARTHUR F. SAXON
By
Christy, Parmelee & Strickland
Attorneys

United States Patent Office 3,359,649
Patented Dec. 26, 1967

3,359,649
APPARATUS FOR THE HEATING OF BULK MATERIAL AND RECOVERY OF VAPORIZABLE PRODUCT THEREFROM
Arthur F. Saxon, Aspinwall Borough, Pa., assignor to Blaw-Knox Company, Pittsburgh, Pa., a corporation of Delaware
Filed Feb. 24, 1966, Ser. No. 529,838
8 Claims. (Cl. 34—173)

ABSTRACT OF THE DISCLOSURE

This application discloses an apparatus for the recovery of solvent from crushed vegetable seeds from which oil has been extracted by the use of a solvent, and which apparatus also roasts the seeds. It comprises a cylindrical column divided horizontally into a succession of compartments, with a door for feeding material from the bottom of one compartment into the one below, and means are provided for heating the material in each compartment. At the top of the column above the uppermost compartment there is a dome with outwardly and upwardly-flaring walls. There is a novel duct arrangement extending down the outside of the column with its upper end opening into the flared walls of the dome. There is an opening through the column from each compartment below the top one through which vapors pass from several compartments into the duct. The bottom of the duct is a sloped door. Vapors rising through the column are heated by contact with the column and by heaters on the column walls. Provision may be made for recirculating some of the vapors from the dome back to the column.

---

This invention is for an appartus for the heating of a bulk material and the removal of recoverable vaporizable products which it contains. The invention is especially useful for an apparatus used in the heat processing of vegetable seeds after they have been crushed or milled and oil extracted therefrom by a solvent process. The apparatus is sometimes referred to in this industry as a desolventizer-toaster.

Without limitation as to other uses, the invention will be herein particularly described in connection with the foregoing industry where oil is extracted from seeds, such as soya-beans, cotton-seed, peanuts, corn germ seeds and other seeds used in the production of vegetable oils.

In the processing of seeds to extract oil by solvent extraction, the seeds are crushed or milled into meal or flakes or otherwise fragmentized and treated with a solvent to extract the oil, leaving the miscella in which vaporizable solvent remains. By heating the meal the solvent may be vaporized while the meal itself is cooked or toasted to produce an edible substance. Apparatus for vaporizing the solvent so that it may be recovered while simultaneously toasting the extracted seed is well known in the art as illustrated, for example, in United States Patents 1,112,128, 2,577,010, 2,585,793, 2,695,459, 2,806,297 and 3,018,564.

As disclosed in these patents, the material from which solvent is to be removed and the material toasted progresses down a hollow column which has spaced horizontal plates therein dividing the interior of the column in a vertical series of compartments, the material progressing through each compartment in succession. In these compartments it is heated and agitated and the finished material is discharged at the bottom of the column or shaft. The solvent is removed as vapor and condensed.

The present invention is concerned with a duct or stack arrangement for the removal of vapors from the several compartments and particularly those several compartments at the top of the column where the release of vapors is most voluminous. According to the invention a vertical duct extends straight up the outside wall of the metal shell forming the hollow column and opens directly into the dome that comprises the top of the column, and which is of larger diameter than the column. The duct extends down along the outside of the column sufficient distance to receive vapors from a plurality of the uppermost compartments, and these compartments have ports through the shell that open directly into the duct through which the vapors flow from the respective compartments into the duct.

Several of the advantages of this arrangements will be hereinafter described, and the invention has for its principal object to provide in a desolventizer-toaster or similar device a novel arrangement for the effective removal of vapors from a plurality of the heating compartments which are provided in an apparatus of this kind.

A further object is to provide in an apparatus of this type means for controlling the velocity at which the vapors are carried through the duct.

These and other objects and advantages are provided by my invention which may be more fully understood by reference to the accompanying drawings, in which:

FIG. 1 is a somewhat schematic side view partly in vertical section and partly in elevation of an apparatus embodying my invention;

FIG. 2 is a transverse section in the plane of line II—II of FIG. 1, but with the structure within the shell omitted;

FIG. 3 is a side elevation of the upper part of the apparatus shown in FIG. 1 illustrating a duct of upwardly-increasing cross-sectional area;

FIG. 4 is a somewhat schematic view similar to FIG. 3, but showing means for controlling the velocity of vapor flow through the duct; and FIG. 5 is a fragmentary elevational view showing one of the manually-operable gate-operating levers.

In the drawings, wherein like reference numerals designate like or similar parts throughout, 2 designates a cylindrical hollow shell forming a vertical column which is divided horizontally by steam-heated trays 3 into a vertical series of compartments, designated 4. Each of the trays has a chute and gate arrangement 5 through which bulk material may be passed downwardly from one compartment to the next in a controlled manner, the gates as here shown being manually operable by hand levers accessible at the exterior of the shell, this arrangement per se forming no part of this invention. Piping as provided in the art for the flow of steam through the several trays is not shown, since this also constitutes no novel part of this invention.

There is a vertical shaft 6 extending up the center of the column. In the lower compartments this shaft has arms 7 that sweep around over the trays to agitate material on the trays, while in the uppermost compartment, or some of them, the shaft has arms 8 that not only serve the same purpose as the arms 7, but which are spargers for discharging steam therefrom into the material. A steam supply pipe for the spargers is designated 9, and steam from this pipe flows through a swivel joint 10 into the central shaft for discharge through the spargers.

At the top of the cylindrical column above the uppermost compartment there is a dome portion 11 which flares outwardly in diameter from the top of the shell to a maximum diameter and over which there is roof portion 11a. Provision is made for discharging material into the dome through an inlet connection 12. There is a vapor scrubber connection 13 in the dome and a vapor outlet connection 14 at the very top.

A motor 15 and reduction gear 16 are provided beneath the shell for driving the central shaft 6. Heating of the shell of the column around each compartment is provided by steam-heated panels 16. These encircle the shell, except where an access door or other protrusion on the shell require an interruption in their continuity around the shell.

So much of the structure as has been described is more or less known in the art. According to the present invention a vertical duct 20 is provided alongside the shell in contiguous relation thereto, the exterior of the shell and the heating panels thereon desirably comprising the inner wall of the duct. However, other heating means may be provided in the shell. The duct extends straight up immediately against the outer side of the shell from a level which includes as many compartments as may be desired. It is here shown extending along the top tier of three compartments, not counting the compartment at the top which opens directly into the dome. The upper end of the duct opens directly into the overhang of the enlarged dome where it projects beyond the column. There may be provided a baffle 21 in the dome in spaced relation to the upper end of the duct.

The compartments to be vented into the duct have ports 22 through the shell directly into the duct, these ports being located immediately below the tray which separates the compartment from the one above.

The duct has a bottom wall 23 that slopes inwardly toward the shell and there is an access closure 24 in this bottom which can be opened or removed to afford access vertically into the duct. Additionally, access closures or doors 25 are provided in the outer wall of the duct opposite each port 22.

With this arrangement the duct carries the vapors from the vented compartments directly into the dome. Entrained dust carried by the gases is released when the gases expand in the large dome area and fall back onto the fresh incoming material. The duct is heated by the shell and by the panels, and may be additionally heated, if necessary, to minimize condensation of the vapors in the duct, and any condensation that occurs may be drained by the sloping bottom of the duct back into the lowermost compartment of the vented tier to be again vaporized.

Prior constructions for carrying out the vapors embodied either a stack remote from the shell with elbows in which dust collected, or for a central stack around the agitator shaft where dust accumulated and which could not be readily cleaned, or an annular space inside the shell around the trays which are therefore of such large volume that the vapors moved too slowly for satisfactory efficient operation.

The present invention has no elbows or lateral piping to collect dust, and by opening the bottom closure 24, even when the unit is in operation, a wooden or other suitable paddle can be entered in the flue to dislodge and remove dust accumulations on the duct walls, and access may be had through removal of the closures 25 to each port 22 for inspection and cleaning while the unit is operating.

In FIG. 3 the structure is the same as previously described, but the duct is of upwardly-increasing cross-sectional area as indicated by the slope of the outer wall of the duct to maintain a desired velocity of the vapors as the volume of the vapors increases. The access doors and closures in the structure are not shown, but would be the same as in FIG. 1.

In FIG. 4, which may have a duct as shown in FIG. 1 or FIG. 3, provision is made for withdrawing some vapors or gases by having a vapor offtake pipe 14a on the offtake outlet 14 and providing therein a branch pipe 30 leading to a blower 31, the outlet of which discharges into a pipe 32 opening into the lower end of the vertical duct. In this way some gases or vapor may be recirculated and the flow of recirculated gases may be controlled, as by a damper 33 in the pipe 32. Here also, as with FIG. 3, access doors and other apparatus as shown in FIG. 1 would be provided.

With this arrangement of FIG. 4 for recirculating vapors and gases, the velocity of upflow of vapors in the vertical duct may be increased or diminished as conditions may require.

It will be understood that while I have illustrated one specific apparatus for the processing of a bulk material such as vegetable seeds that have been subjected to the solvent extraction of oil, this apparatus may vary from the one here shown, and other changes and modifications may be made within the contemplation of my invention and under the scope of the following claims.

I claim:

1. In an apparatus for heating bulk materials and removing vaporizable components therefrom wherein there is a shell in the form of a hollow column, the interior of which is divided into a series of compartments arranged one above another, means for agitating material in each compartment and transferring it to the one beneath, means for heating the material in said compartments, and a dome with outwardly flaring walls forming the top of the column above the uppermost compartment and which is of larger diameter than the column itself, the dome having an inlet for bulk material to be heated and an outlet for vapors, the invention comprising:
    (a) a vapor duct extending vertically alongside the column and contiguous thereto, said duct having a closed bottom and having its upper end opening into the outwardly-flaring walls of the said dome above the uppermost compartment,
    (b) the duct extending downwardly from the dome past several of the uppermost compartments,
    (c) each compartment along which the duct extends except the top one having a port in the wall thereof opening through the shell into said duct.

2. The invention as defined in claim 1 in which provision is made for heating the interior of the duct to retard condensation of vapor.

3. The invention defined in claim 1 in which the exterior of the shell is provided with heating panels and a portion of said panels is enclosed in said duct for heating the interior of the duct.

4. The invention defined in claim 1 in which the closed bottom of the duct comprises a movable closure.

5. The invention defined in claim 1 wherein the closed bottom of the duct slopes downwardly toward the shell and comprises a movable closure.

6. The invention defined in claim 1 wherein the duct is provided with means for accelerating the upflow of vapors therethrough.

7. The invention defined in claim 1 wherein the duct is provided with means for controlling the upflow of vapors in the duct.

8. The invention defined in claim 1 wherein means is provided for recycling gases from the dome into the duct at a controlled rate.

References Cited

UNITED STATES PATENTS

| 67,256 | 7/1867 | Boden | 34—173 X |
| 230,128 | 7/1880 | Gubbins | 34—173 X |
| 1,039,440 | 9/1912 | Puckett et al. | 34—171 |
| 2,147,151 | 2/1939 | Connolly | 34—173 X |
| 3,018,564 | 1/1962 | Kruse et al. | 34—173 |

KENNETH W. SPRAGUE, *Primary Examiner.*